United States Patent [19]
Rose

[11] Patent Number: 5,626,746
[45] Date of Patent: May 6, 1997

[54] FILTERING DEVICE CONTAINING CHEMICAL ENCAPSULATION FILTER AND SIZE DISCRIMINATING FILTER

[76] Inventor: William C. Rose, 6911 Harewood Park Dr., Baltimore, Md. 21220

[21] Appl. No.: 506,817

[22] Filed: Jul. 25, 1995

[51] Int. Cl.$^6$ .............................. B01D 17/12; B01D 36/00
[52] U.S. Cl. ..................... 210/109; 210/238; 210/295; 210/483
[58] Field of Search ....................... 210/97, 109, 165, 210/238, 259, 266, 282, 295, 314, 315, 483, 484, 691, 749, 908, 86, 143, 751

[56] References Cited

U.S. PATENT DOCUMENTS

| | | | |
|---|---|---|---|
| 5,207,910 | 5/1993 | Rieber | 210/751 |
| 5,273,661 | 12/1993 | Pickett et al. | 210/751 |
| 5,391,295 | 2/1995 | Wilcox | 210/266 |
| 5,511,904 | 4/1996 | Van Egmond | 210/165 |

*Primary Examiner*—Joseph W. Drodge
*Attorney, Agent, or Firm*—Walter G. Finch

[57] ABSTRACT

A polishing filter having the capabilities for removing small solids and hydrocarbons present within a liquid flow is a filtration device to be used either in conjunction with processes already in existence or as a stand-alone unit. The polishing filter can be used for marine, commercial or industrial activities. Small solids will be discriminated hi( size by a removable and replaceable bag filter. Residing inside the bag filter is the polishing filter bonding media, a hydrocarbon encapsulation agent used to separate and bond emulsified and dissolved oils. This bonding media is contained inside a porous membrane bag which is also removable and replaceable. The .addition of this device to already existing equipment utilized by ocean vessels and commercial and industrial activities will enhance the decontamination process and assist in compliance with local, national and international clean water laws for effluent from ships and shore-based activities.

8 Claims, 2 Drawing Sheets

FILTERING DEVICE CONTAINING CHEMICAL ENCAPSULATION FILTER AND SIZE DISCRIMINATING FILTER

BACKGROUND OF THE INVENTION

Restrictions on the levels of hydrocarbons in liquids that may be discharged into navigable and other surface waters, as well as sanitary systems, have become considerably more stringent in recent years. Local, national and international clean water laws have made the typical waste water treatment processes commonly used by ocean vessels and commercial and industrial facilities obsolete by demanding an effectiveness that the commonly used processes are not capable of meeting. In fact, until the introduction of the more restrictive effluent standards, many maritime, commercial and industrial facilities did not need any treatment facilities because their effluent quality was within the parameters of the older standards.

The typical treatment process, if any exists, is a coalescing type gravity separator. These separators depend on the cohesive and adhesive qualities of hydrocarbons and their positive buoyancy. The adhesive qualities of hydrocarbons are used to the treatment system's advantage by either rapid deceleration of the waste stream, a tortuous path, agglomeration of the hydrocarbons on a fibrous material, or a combination of two or more of the above methods. Any of the foregoing methods coalesce small droplets of oil into larger droplets which, if not contaminated with an offsetting negatively buoyant particle, will rise to the top of the treatment tank for removal by skimming. An additional benefit of this type of treatment is that negatively buoyant particulate matter falls to the bottom of the treatment tank as the hydrocarbons rise to the top of the tank. However, neutrally buoyant particulate matter passes through the gravity separator type of treatment facility.

While the gravity type separator has been sufficiently efficient to meet older requirements for liquid hydrocarbon emissions, many designs do not meet the more stringent requirements of today. Additionally, the gravity type separator is only effective on hydrocarbons in their free state. If there is a shift of state to either emulsified or dissolved, the gravity separator has no ability to remove the hydrocarbon contamination because emulsified and dissolved hydrocarbons have little or no buoyancy. The presence of dissolved and emulsified hydrocarbons in the effluent from marine, commercial and industrial activities, as well as free hydrocarbons from untreated waste streams, has become a target for environmental activist groups and is now a violation of local, national and international clean water laws.

SUMMARY OF THE INVENTION

This invention relates to a water filtering device. More particularly this invention relates to a water filtering device for marine, commercial and industrial use as an addition to already existing filtration processes, or as a stand alone water filtering device where none exists.

Presently, local, national and international clean water laws have forced marine, commercial and industrial activities to implement new water treatment processes designed to remove free, emulsified and dissolved hydrocarbons and solid material to levels below the capabilities of existing processes.

This present invention provides a treatment process which can be added to processes now existing in vessels and in commercial and industrial activities which will decontaminate effluent from those activities to levels which adhere to local, national and international clean water laws by removing both dissolved and emulsified oils as well as free oil, and also small and neutrally buoyant solids.

The waste stream from a marine, commercial or industrial activity can flow into the polishing filter either directly or after pre-treatment in a gravity separator. The polishing filter contains two filtering processes within its housing canister. First, the liquid will come in contact with the polishing filter's bonding agent which will encapsulate and separate hydrocarbons that are still contaminating the liquid, namely mostly dissolved and emulsified hydrocarbons. The polishing filter will also encapsulate free hydrocarbons that may be present in the liquid.

Upon passage through the bonding agent, the liquid comes in contact with the second filtering process, a size discriminating filter used to separate small solid contaminants still present within the liquid flow.

Once through the polishing filter, the liquid will be free of contaminants and can be discharged into a natural water source.

The order in which the liquid passes through the tanks is essential to effective and efficient removal of the remaining hydrocarbons, as any solids or free oil present within the liquid will inhibit contact between the target contaminant and the bonding agent.

Furthermore, this filtering device has a removable lid to allow for easy replacement of both the bonding media, contained inside a bag with a handle, and the size discriminating filter.

It is therefore an object of this invention to provide an additional treatment process to enhance that which already exists in vessels and commercial and industrial activities for effluent discharge into natural waters and other points.

It is a further object of this invention to provide a combination of hydrocarbon bonding technology and mechanical size discrimination for applications where no gravity type separator has been installed.

It is a further object of this invention to provide a combination of hydrocarbon bonding technology and mechanical size discrimination for applications where no gravity type separator can be installed due to size or other restrictions.

It is a further object of this invention to provide a combination of hydrocarbon bonding technology and mechanical size discrimination filtering within one tank.

It is still a further object of this invention to provide a filtration device which has a during operation replacement system for its internal components.

BRIEF DESCRIPTION OF THE DRAWINGS

The above and other objects, features and advantages of the invention will become more readily apparent from the following with reference to the accompanying drawings in which.

DETAILED DESCRIPTION OF THE DRAWINGS

Figure 1:
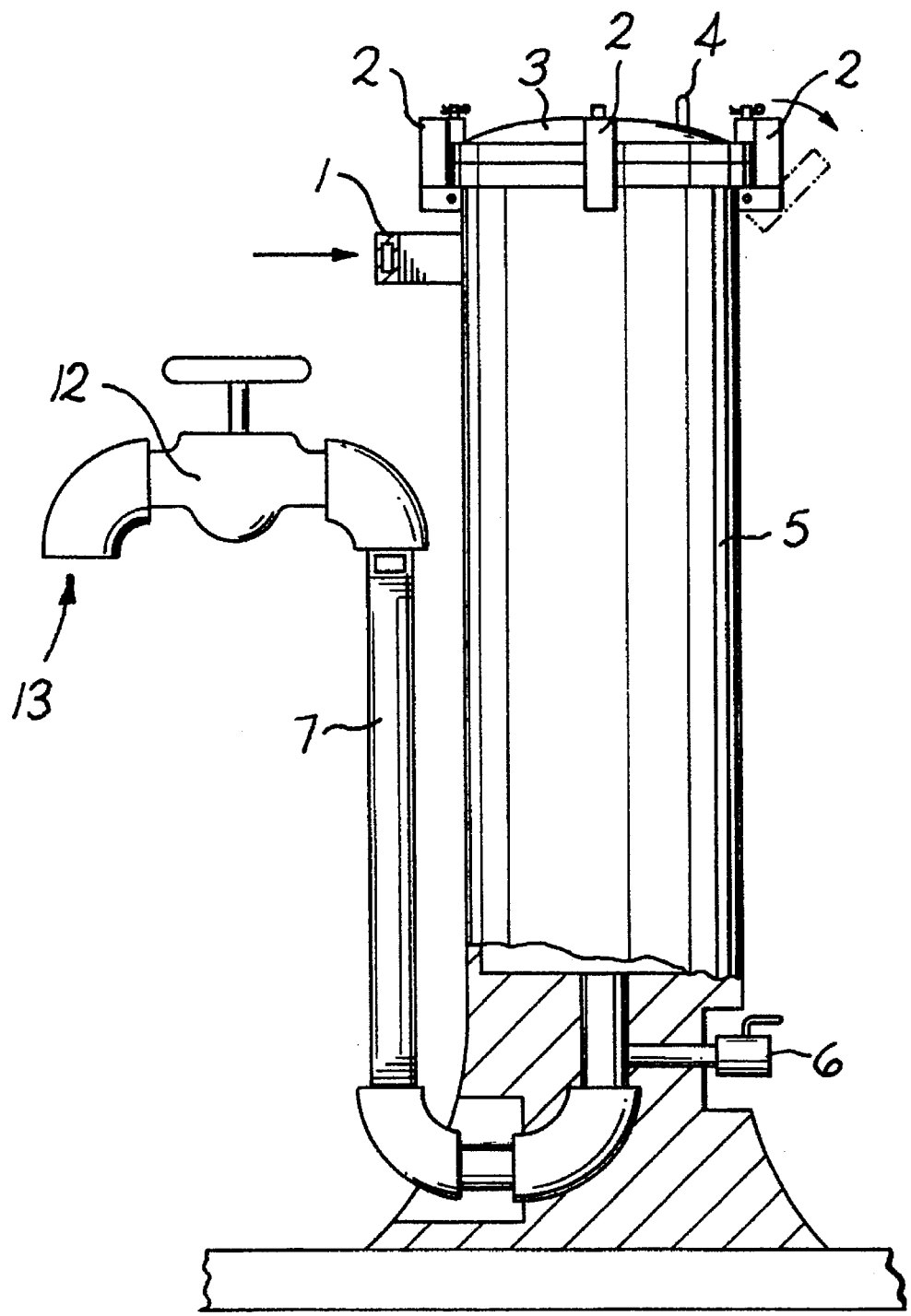
FIG. 1 is an elevation of the filtering device with a partial cross sectional drawing of the draining equipment incorporated.

Referring to FIG. 1, an elevation of the polishing filter in operation is shown. The inlet 1 of the filter receives liquid from any preceding filtering devices. Once the liquid passes through the polishing filter's housing canister, it is discharged into a natural water source through its drain 13. The treated water can be discharged into a natural water source since it now meets local, national and international laws on effluent from marine, commercial and industrial activities. This is so because the polishing filter media 9 (FIG. 2) effectively removes emulsified and dissolved oils and other hydrocarbons which are not removed by any other treatment facilities if they exist.

Figure 2:
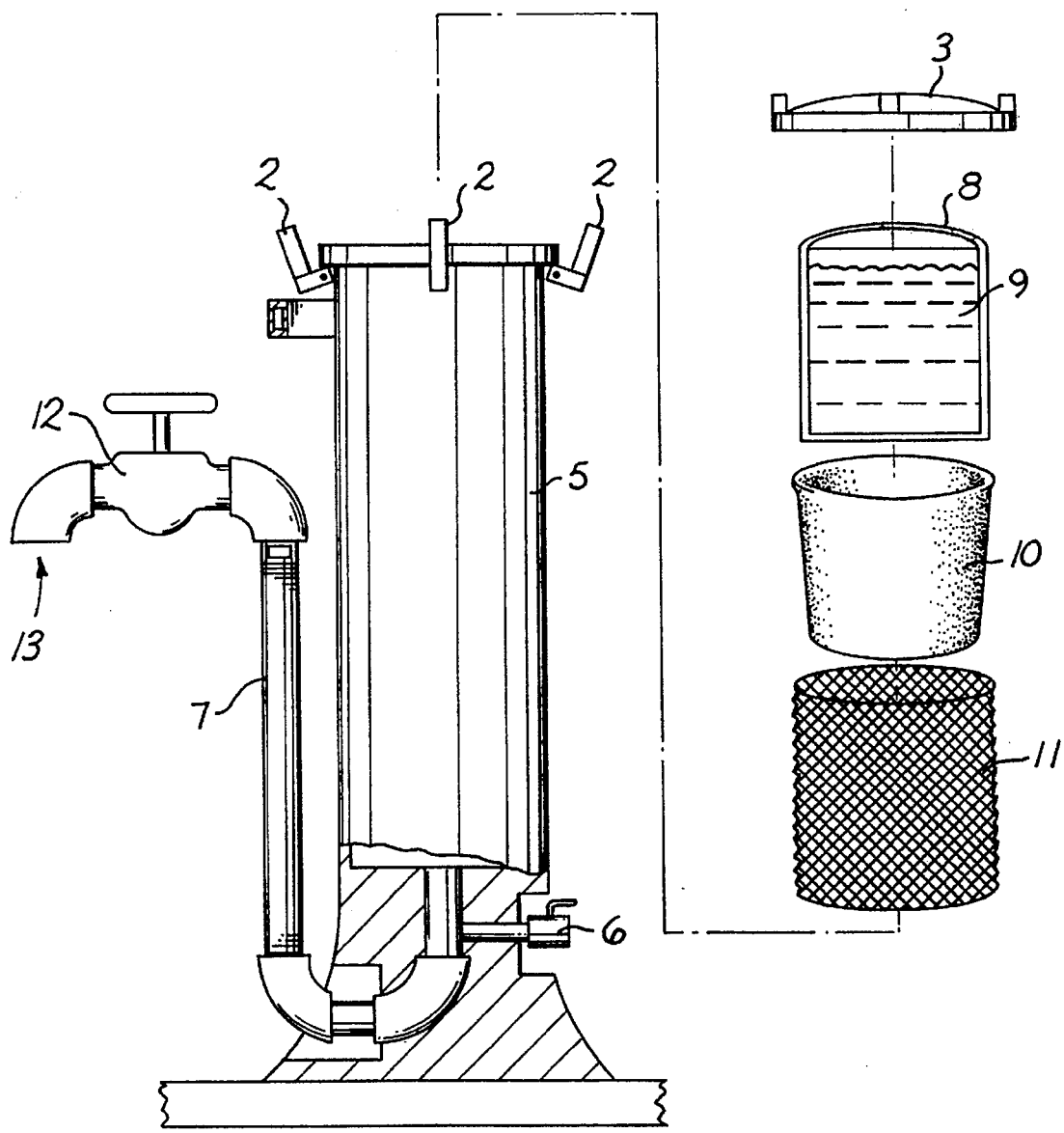
FIG. 2 is an exploded view of the internal filtering and bonding equipment utilized by the polishing filter.

Referring to FIG. 2, an exploded internal view of the canister 5 is shown, depicting the sequence in which the water contacts each of he internal components. The water will first contact the polishing filter media 9. This media 9 is a bonding agent which encapsulates hydrocarbons which are present in the flow, including free, dissolved and emulsified oil. The bonding agent can be of any type that can perform this chemical encapsulation, such as agent A620, manufactured by the NO-CHAR company. The bonding process is accomplished by forcing contact between the targeted chemicals and the bonding agent.

To assure sufficient bonding contact exists, the level in the canister and the consequential time of contact can be adjusted by the level control pipe 7.

To eliminate syphoning of the liquid in the tank, the liquid is discharged through a vacuum break 12.

Before being discharged, the water will also be strained through a size discriminating filter 10 which will remove any solids that may remain in the water as well as provide a housing for the polishing filter media 9. This filter 10 is supported by a rigid forming screen 11 to maintain a uniform layer of the filter 10 across a cross section of the canister 5. Once through the filter 10, the process is complete and the water can be discharged into a natural water source.

The encapsulation process will inevitably deplete the polishing filter media 9 and it will therefore need to be replenished by replacement. Replacement is accomplished by venting any pressure in the canister through the pressure vent valve 4, and then removing four equidistant quick release clamps 2 located at the top of the canister housing 5 and removing the canister lid 3. Once open, the polishing filter media 9 is lifted out of the canister 3 by its handle 8. A new bag of polishing filter media 9 is then placed into the size discriminating filter 10 and the lid 3 is replaced.

The filter's size discriminating filter 10, which prevents any small solid contaminants from being discharged, will also require cleaning or replacement when it becomes clogged from prolonged use. The process by which the filter 10 will be exchanged with a new one will be identical to that of replacing the polishing filter media bag 9, except that an additional step of removing the polishing filter bag 9, in order to get to the filter 10, is required.

During the replacement of either the polishing filter media 9 or of the size discriminating filter 10, only the polishing filter canister 5 will need to be drained through the drain and sample tube 6 and not the entire system. Therefore, replacement will be completed without shutdown of the entire decontamination process.

It is understood that this is only the preferred embodiment of this invention, and that it could be utilized with other treatment processes and with other types of bonding medias without deviating outside the scope of the claims.

What is claimed is:

1. A liquid treatment device, comprising: means for removing contaminants from a liquid and chemically bonding said removed contaminates to a media;

means for size discriminating contaminants from said liquid;

means for supporting said means for size discriminating;

means for housing said removing and chemically bonding means, said size discriminating means and said supporting means, said means for housing defining a chamber; and means for controlling the level of said liquid in said chamber so as to control the time the treatment of said liquid in said housing means.

2. A liquid treatment device, as recited in claim 1, wherein said means for bonding contaminants is a hydrocarbon encapsulating polymer media.

3. A liquid treatment device, as recited in claim 2, wherein said hydrocarbon encapsulating polymer media is enclosed within a porous material which incorporates a handle for easy removal and replacement of said hydrocarbon encapsulating polymer media.

4. A liquid treatment device, as recited in claim 1, wherein said means for size discriminating is a porous bag filter.

5. A liquid treatment device, as recited in claim 4, where said porous bag filter is removeable and replaceable.

6. A liquid treatment device, as recited in claim 1, wherein said means for supporting is a forming screen.

7. A liquid treatment device, as recited in claim 1, wherein said means for housing is a canister with a removable lid allowing entry into said canister.

8. A liquid treatment device, as recited in claim 1, wherein said means for controlling the level of said liquid is a level control pipe and a vacuum break connected thereto.

* * * * *